United States Patent [19]

Yodogawa et al.

[11] 4,254,070
[45] Mar. 3, 1981

[54] PROCESS FOR PRODUCING SINTERED BODY OF CERAMIC COMPOSITION FOR VOLTAGE NON-LINEAR RESISTOR

[75] Inventors: Masatada Yodogawa; Matsuo Morisawa; Takashi Yamamoto; Katsunobu Okutani, all of Tokyo, Japan

[73] Assignee: TDK Electronics Company, Limited, Tokyo, Japan

[21] Appl. No.: 89,401

[22] Filed: Oct. 30, 1979

[30] Foreign Application Priority Data

Dec. 25, 1978 [JP] Japan ............... 53/161384

[51] Int. Cl.³ .................. H01C 7/02; C04B 33/34
[52] U.S. Cl. ............................. 264/61; 29/612; 252/518; 252/521; 264/65; 264/66; 264/85
[58] Field of Search ............ 264/61, 65, 104, 85, 264/66; 29/610 R, 612; 252/518, 521

[56] References Cited

U.S. PATENT DOCUMENTS

| 3,000,828 | 9/1961 | Buckley et al. | 264/65 |
| 3,585,261 | 6/1971 | Baba | 264/61 |
| 3,903,226 | 9/1975 | Iga et al. | 264/61 |
| 3,953,371 | 4/1976 | May | 264/61 |
| 4,094,061 | 6/1978 | Gupta et al. | 264/61 |
| 4,142,996 | 3/1979 | Wong et al. | 264/61 |

Primary Examiner—Donald J. Arnold
Attorney, Agent, or Firm—Oblon, Fisher, Spivak, McClelland & Maier

[57] ABSTRACT

A sintered body of a ceramic composition for voltage non-linear resistor is produced by sintering an oxide semiconductor composition comprising a main component of zinc oxide and a minor component at 1100° to 1400° C.; then maintaining the sintered body in an inert gas such as $N_2$, Ar and so on having an oxygen content of 0.1 to 21 vol. % at the temperature lower than the sintering temperature for a specific time; changing the atmosphere into an inert gas having an oxygen content of lower than 0.02 vol. % at 800° to 1200° C.; and cooling it.

10 Claims, 2 Drawing Figures

PROCESS FOR PRODUCING SINTERED BODY OF CERAMIC COMPOSITION FOR VOLTAGE NON-LINEAR RESISTOR

BACKGROUND OF THE INVENTION

1. Field of the Invention

The present invention relates to a process for producing a sintered body of a ceramic composition for voltage non-linear resistor which comprises a main component of ZnO and a minor component of a transition metal of Co, Mn, Ni or an alkaline earth component or a rare earth component etc. More particularly, it relates to a process for producing a sintered body of a ceramic composition for voltage non-linear resistor which has remarkably large voltage non-linearity and large discharge capacity.

2. Description of the Prior Art

Recently, the uses of semiconductors and semiconductor circuits have been increased in measuring instruments, control instruments, communication instruments and power source instruments because of remarkable development of semiconductors and semiconductor circuits such as thyristors, transistors and IC etc. Thus, the miniaturization and high function of these instruments have been attained. On the other hand, withstand voltage, surge voltage resistance and noise resistance of these instruments and parts thereof have not satisfactorily developed so as to follow the developments of these instruments. Thus, it is important to protect these instruments and parts from abnormal surges or noises or to stabilize these circuit voltages.

It has been required to develop economical substances for voltage non-linear resistors which has excellent voltage non-linearity, excellent discharge capacity and long life characteristic in order to overcome the problems.

The voltage non-linear resistors (referring to as varistors) such as SiC variators and Si diode varistors; and zener diodes have been used for said purposes. Recently, varistors comprising a main component of zinc oxide and an additive have been proposed.

The voltage-ampere characteristic of a varistor is usually shown by the equation $$I=(V/C)^\alpha$$

wherein V designates a voltage applied to the varistor and I designates a current passed through the varistor and C designates a constant corresponding to the voltage when the current is passed.

The exponent α can be given by the equation $$\alpha = \log_{10}(I_2/I_1)/\log_{10}(V_2/V_1) \quad (1)$$

wherein $V_1$ and $V_2$ respectively designate voltage under passing the current $I_1$ or $I_2$.

A resistor having $\alpha=1$ is an ohmic resistor and the nonlinearity is superior when the α-value is higher. It is usual that α-value is desirable as high as possible. The optimum C-value is dependent upon the uses of the varistor and it is preferable to obtain a sintered body of a ceramic composition which can easily give a wide range of the C-value.

Thus, it is preferable to use the substance which easily give a wide range of values C.

The conventional silicon carbide varistors can be obtained by sintering silicon carbide powder with a ceramic binding material. The non-linearity of the silicon carbide varistors is based on voltage dependency of contact resistance between silicon carbide grains. Accordingly, the C-value of the varistor can be controlled by varying a thickness in the direction of the current passed through the varistor. However, the non-linear exponent α is relatively low as 3 to 7. Moreover, it is necessary to sinter it in a non-oxidizing atmosphere. On the other hand, the non-linearity of the silicon varistor is dependent upon the p-n junction of silicon whereby it is impossible to control the C-value in a wide range.

The non-linearity of the zener diode varistor is also depending upon the p-n junction of silicon. Thus, the voltage non-linearity is remarkably great, however it is difficult to prepare the element for high voltage. Moreover, the discharge capacity is small and the endurance to surge is weak to be disadvantages.

Recently, varistors comprising a main component of zinc oxides and a minor component of transition metal such as cobalt manganese and nickel have been developed and practically used.

The non-linearity of the latter varistor is caused by the sintered body itself to be greater than 30 of the index α. However, the discharge capacity is not always satisfactory for the purpose of the protection of the circuit or elements and the field of the uses of such varistors is limited.

It has been proposed to improve the discharge capacity by coating a glassy material on a sintered product, heat-treating it at high temperature to diffuse it.

However, this method has the following disadvantages.

(1) The steps are increased to increase the cost;

(2) The mass production is not easily carried out because the elements are easily adhered each other by the grassy material after coating the glassy material; and (3) The diffusion of the glass is highly affected by the distribution of the temperature in the oven whereby it is difficult to produce products having uniform characteristic at high non-defect ratio.

Thus, the cost of the element is remarkably high and the elements having high discharge capacity have not been commercialized, disadvantageously.

SUMMARY OF THE INVENTION

It is an object of the present invention to overcome the disadvantages of the conventional zinc oxide type varistors.

It is another object of the present invention to improve the discharge capacity of the varistor for more than several times without increasing steps.

The foregoing and other objects of the present invention have been attained by providing a process for producing a sintered body of a ceramic composition for voltage non-linear resistor by sintering a shaped oxide semiconductor composition comprising a main component of zinc oxides and a minor component of a transition metal etc. at 1100° C. to 1400° C.; maintaining it in an inert gas such as $N_2$, Ar and so on having an oxygen content of 0.1 to 21 vol.% preferably 0.5–10 vol.% at the temperature lower than the sintering temperature; and then, cooling it in an inert gas such as $N_2$, Ar and so on having an oxygen content of less than 0.02 vol.% at the temperature of 800° to 1200° C.

DETAILED DESCRIPTION OF THE PREFERRED EMBODIMENTS

Figure 1:
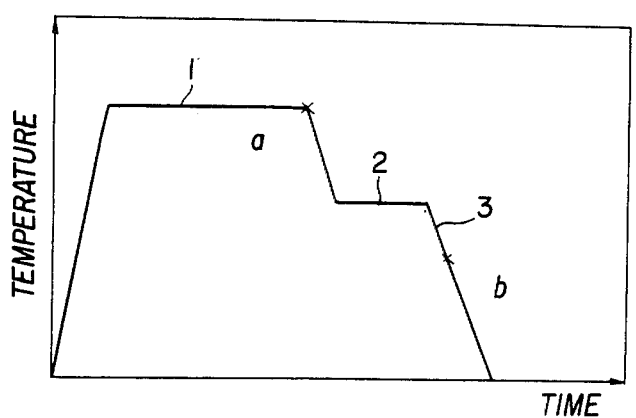

The concept of the preparation of the ceramic composition for voltage non-linear resistor of the present invention will be illustrated in FIG. 1.

The feature of the process of the present invention is to provide the multi-step sintering steps shown in FIG. 1.

Firstly, the shaped oxide semiconductor composition is sintered at the temperature of 1100° to 1400° C. as shown by (1). The atmosphere in the sintering can be air, a reducing atmosphere or an inert gas atmosphere.

Secondly, the sintered product is maintained at the temperature lower than the sintering temperature preferably 50° C. to 250° C. lower than the sintering temperature as shown by (2) (maintaining temperature) for certain time preferably 10 minutes to 4 hours and the atmosphere is changed to an inert gas having an oxygen content of 0.1 to 21 vol.% preferably 0.5–10 vol.% at the point (a) in FIG. 1. The maintaining temperature is preferably in a range of 1000° C. to 1300° C.

The product is cooled as shown by (3). At the point (b) during the cooling, the atmosphere is switched to the inert gas atmosphere having an oxygen content of less than 0.02 vol.%.

The temperature at the changing time is preferably in the range of 800° to 1200° C.

The cooling step at (3) can be the annealing or the quenching.

After cooling it at lower than 700° C., the inert atmosphere can be changed to the air, if desired.

In accordance with the process of the present invention, the shaped oxide semiconductor composition comprising a main component of zinc oxides and a minor transition metal etc. is sintered by the specific multi-step method, whereby the discharge capacity which can not be obtained by the conventional sintering process such as greater than 8000 A/cm$^3$ can be obtained. The discharge capacity means a maximum current having less than 10% of a variation of $V_{0.1}$ (voltage is passing 0.1 mA of current) before and after applying one impulse current having waveform of $8 \times 20\mu$ sec.

The components of the shaped oxide semiconductor composition are described in our former invention disclosed in U.S. Pat. No. 4,077,915 and No. 4,160,748.

The main component is zinc oxide.

The minor components can be the transition metal components, alkalineearth metal components and rare earth components.

The content of the transition metal component such as Ni, Mn or Co is preferably ranging from 0.1 to 20 mole % as MO. (M=transition metal)

The content of the alkaline earth metal component such as Ca, Mg, Ba or Sr is preferably ranging from 0.1 to 5 mole % as M'O. (M'=alkaline earth metal)

The content of the rare earth metal component is ranging from 0.01 to 5 mole % as $R_2O_3$. (R=rare earth metal)

In the following examples, the soaking (2) is carried out in one step, however the soaking (2) can be two or more steps at soaking temperatures such as 1200° C. and 1100° C. The effect of the present invention is further remarkable in the multi-steps.

The present invention will be further illustrated by certain examples and references which are provided for purposes of illustration only and are not intended to be limiting the present invention.

EXAMPLE 1

The raw materials for the oxides were weighted at the ratio listed in Table 1 and were mixed in a wet ball-mill for 20 hours.

The mixture was dried and calcined at 700° to 1200° C. and pulverized in a wet ball mill and dried and polyvinyl alcohol was added as a binder and the mixture was granulated and was shaped to a disc having a diameter of 16 mm, a thickness of 1.2 mm by a press molding method.

The shaped body was sintered at 1320° C. for 2 hours.

The sintered product was maintained in the inert gas atmosphere having different oxygen content shown in Table 2 at the temperature lower than the sintering temperature (1200° C.) for 2 hours.

The product was cooled and when it reached to 900° C., the atmosphere was changed to an inert gas atmosphere having an oxygen content of less than 0.02 vol.% and the product was further cooled to the room temperature.

Each electrode was connected to both sides of the sintered body and the voltage-ampere characteristics ($\alpha$) and the discharge capacities were measured. The results are shown in Table 2.

TABLE 1

| | Mole % | | | |
|---|---|---|---|---|
| ZnO | CoO | Gd$_2$O$_3$ | BaO | Al$_2$O$_3$ |
| 87.4 | 11 | 0.5 | 1.0 | 0.1 |

TABLE 2

| Sample No. | Oxygen content in atmosphere for maintenance | $\alpha$ | Discharge capacity |
|---|---|---|---|
| 1 | 1% | 40 | 7000 |
| 2 | 5% | 50 | 6000 |
| 3 | 10% | 60 | 4000 |
| 4 | None | 40 | 900 |

No. 4: Reference:
The molded product was sintered at 1320° C. for 2 hours and was cooled.

As it is clear in Table 2, the samples No. 1 to 3 of the present invention had superior discharge capacity to that of the sample No. 4 which was sintered in air.

As the transition metal, cobalt component was incorporated in the example. Thus, the same results are obtained by the incorporation of nickel or manganese component, instead of the cobalt component.

Gadolinium component was incorporated in the example. Thus, the same results are obtained by the incorporation of lanthanum, praseodymium, neodymium, samarium, europium, dysprosium, terbium, holmium, erbium, thulium, ytterbium or lutetium component instead of the gadolinium component. Barium component was incorporated in the example. Thus, the same results are obtained by the incorporation of calcium or strontium component instead of the barium component.

EXAMPLE 2

Figure 2:
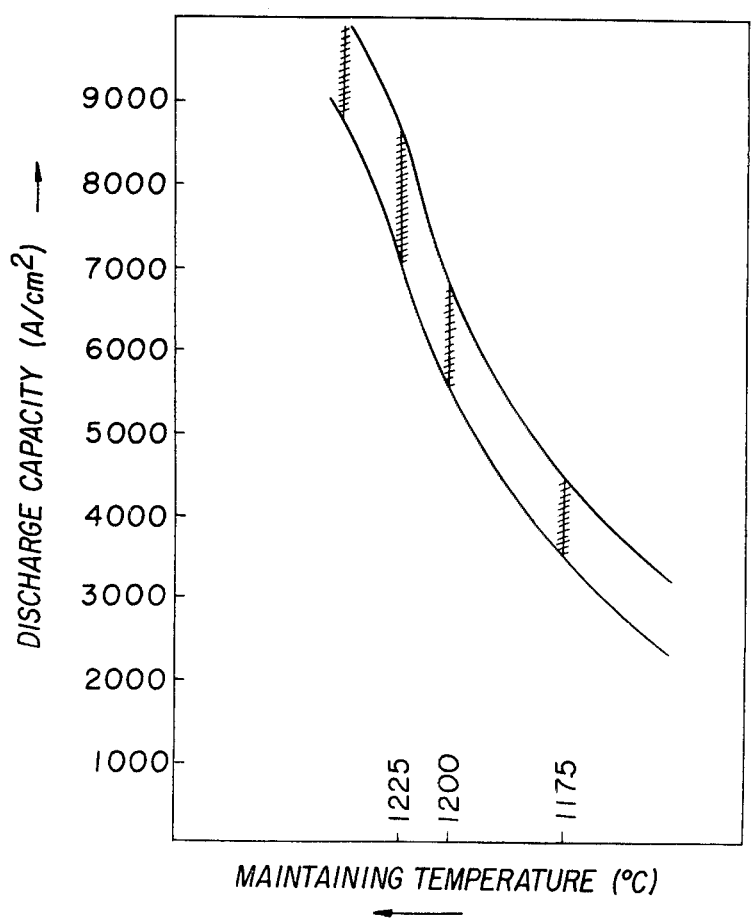

The shaped body sintered in the process of Example 1 was maintained at the maintaining temperature of 1000° to 1300° C. to obtain varistors and the discharge capacities thereof were measure and shown in FIG. 2. The sintering was carried out at 1320° C. for 2 hours as that of Example 1. The atmosphere in the maintaining step had an oxygen content of 5%.

It is clearly understood from FIG. 2, that the discharge capacity is highly depending upon the maintaining temperature.

As described above, the present invention is to remarkably improve the discharge capacity of the voltage non-linear resistor having a main component of ZnO by varying the temperature and the atmosphere in the sintering step in multi-steps.

We claim:

1. A process for producing a sintered body of a ceramic composition for voltage non-linear resistor which comprises sintering an oxide semiconductor composition comprising a main component of zinc oxide and a minor component of another meter oxide at 1100° to 1400° C.; then soaking the sintered body in an inert gas having an oxygen content of 0.1 to 21 vol.% for a specific time; changing the atmosphere into an inert gas having an oxygen content of lower than 0.02 vol.% at 800° to 1200° C.; and cooling it.

2. A process according to claim 1 wherein said oxide semiconductor composition comprises more than 70 mole % of ZnO.

3. A process according to claim 1 wherein said oxide semiconductor composition comprises a transition metal component.

4. A process according to claim 3 wherein said oxide semiconductor composition comprises a rare earth metal component.

5. A process according to claim 3 wherein said oxide semiconductor composition comprises an alkaline earth metal component.

6. A process according to claim 1 wherein the oxygen content in the inert gas in ranging from 0.5 to 10 vol.%.

7. A process according to claim 3 wherein the content of the transition metal component is ranging from 0.1 to 20 mole % as MO(M=transition metal).

8. A process according to claim 4 wherein the content of the rare earth metal component is ranging from 0.01 to 5 mole % as $R_2O_3$(R=rare earth metal).

9. A process according to claim 5 wherein the content of the alkaline earth metal component is ranging from 0.1 to 5 mole % as M'O(M'=alkaline earth metal).

10. A process according to claim 1 wherein the soaking is carried out in two or more steps.

* * * * *